(12) United States Patent
Desrochers

(10) Patent No.: US 6,553,405 B1
(45) Date of Patent: Apr. 22, 2003

(54) SELF-CONFIGURABLE DISTRIBUTED SYSTEM

(75) Inventor: Stéphane Desrochers, Blainville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/513,498

(22) Filed: Feb. 25, 2000

(51) Int. Cl.[7] .............................................. G06F 13/00
(52) U.S. Cl. ...................................................... 709/203
(58) Field of Search ............................... 709/203, 212, 709/217, 223

(56) References Cited

U.S. PATENT DOCUMENTS

| | | | |
|---|---|---|---|
| 5,796,952 A | * 8/1998 | Davis et al. | 709/224 |
| 5,893,118 A | 4/1999 | Sonderegger | 707/203 |
| 5,928,323 A | 7/1999 | Gosling et al. | 709/203 |
| 6,138,155 A | * 10/2000 | Davis et al. | 709/224 |
| 6,289,382 B1 | * 9/2001 | Bowman-amuah | 709/226 |
| 6,477,580 B1 | * 11/2002 | Bowman-Amuah | 709/231 |

FOREIGN PATENT DOCUMENTS

EP 0718761 A1 12/1995
EP 0817031 A2 6/1997

* cited by examiner

Primary Examiner—David Y. Eng
(74) Attorney, Agent, or Firm—Smith & Danamaraj, P.C.

(57) ABSTRACT

A self-configurable distributed computer software system and a method of enabling an applet running on a Web browser in the system to obtain needed software code in the form of Java classes from a machine that is not hosting the applet's originating Web server. A Lightweight Directory Access Protocol (LDAP) server stores Java classes utilized by a plurality of applets distributed throughout the system. The applet's Web server is connected to the Web browser and to the LDAP server, and includes a servlet for retrieving Java classes from the LDAP server. When the Web browser requests a needed Java class from the Web server, the Web server determines from the package name of the requested Java class whether or not the requested class is stored on the Web server's local storage disk. If not, the Web server requests the servlet to retrieve the Java class from the LDAP server. The servlet retrieves the byte code corresponding to the requested Java class, and the Web server provides it to the Web browser. The Web browser then converts the code to a Java class for use by the applet.

15 Claims, 2 Drawing Sheets

SELF-CONFIGURABLE DISTRIBUTED SYSTEM

BACKGROUND OF THE INVENTION

1. Technical Field of the Invention

This invention relates to computer software systems and, more particularly, to a self-configurable distributed system and a method of enabling software application programs running on one machine to obtain needed adapter functionality from another machine.

2. Description of Related Art

The World Wide Web (the "Web") is rapidly growing in popularity, and as it does, so does the use of Web browsers. Portions of client software application programs known as "applets" run inside Web browsers. Many times, the applets required to perform a complete function are distributed throughout the Web on different machines. In such distributed systems, a new component category can appear and be removed on-the-fly; when this happens, older components must learn how to communicate with these new components through a self-configuration mechanism, for example automatically loading appropriate display handlers or content handlers. Self-configuration, therefore, is increasingly becoming a required feature because of the dynamic nature of distributed systems.

Web server machines are basically repositories of HyperText Machine Language (HTML) pages for general browsing and Java classes for applets. This mixture of HTML pages and Java classes raises security issues regarding the applets, so an applet security model, also referred to as the "sandbox", has been created. Due to constraints imposed by the applet security model, applets can only open a connection to the machine that they have been downloaded from, which is their own Web server. This constraint is a serious limitation when applets themselves are components of a distributed self-configurable system because each applet can only communicate with components located on the same machine that is hosting the original server the applet was downloaded from. Additionally, the applets can only load configuration classes such as display handlers or content handlers from that particular Web server, and nowhere else. Because of the dynamic nature of distributed systems, applets that are themselves components of a distributed system are too limited by the sandbox.

When utilizing Common Object Request Broker Architecture (CORBA) mechanisms, part of this problem is resolved through the use of gatekeeper technology. The gatekeepers act as intermediaries on the Web server machine, and use a tunneling mechanism to open connections to other machines. A CORBA-based applet can open a "virtual" connection to CORBA objects that are located on other machines. This elegantly solves the problem of enabling applets to open connections to any CORBA objects.

The gatekeeper technology, however, solves only half of the whole problem. Applets can open connections to any CORBA objects even if they are not located on the Web server machine, but the solution does not work if further self-configuration is required before the communication can take place. For example, if an applet wants to communicate with a CORBA object on Machine-Z (which is not the Web server), but requires a special content handler that is also stored on Machine-Z in order to do that, there is currently no way that the content handler can be downloaded from Machine-Z. This is because (1) the applet cannot open a direct connection to Machine-Z, and (2) even if the connection could be indirectly opened using a mix of CORBA and gatekeeper technology, the downloaded byte code could not be converted into a fully instantiated Java class because applets are not allowed by the sandbox to create class loaders. A class loader is the only way to convert byte code into a Java class.

An alternative approach may be to copy Java classes on the web server's machine. However, this approach is highly impractical and extremely difficult to manage. If new component types requiring new display handlers are introduced on the fly, it would require a cumbersome mechanism to make sure their display handler classes are copied on the web server machine.

Another alternative is using signed applets. The use of signed applets, however, is very complex, and the code must be signed with security keys, and certificates are required. Therefore, the use of signed applets is not practical for real-time self-configuration in a distributed system.

In order to overcome the disadvantage of existing solutions, it would be advantageous to have a system and method for enabling applets to get adapter functionality from other machines. The present invention provides such a system and method.

SUMMARY OF THE INVENTION

The present invention is a self-configurable system that includes a Web browser hosting applets and providing them with an execution environment, a Web server to which the Web browser is issuing requests, a servlet at the service of the Web server, and finally a distributed persistent storage mechanism to which the servlet is issuing queries on behalf of the Web server. Many other Web servers may share the storage mechanism which holds among other information, Java byte code for adapters that are used by a plurality of applets and possibly other distributed applications.

A typical applet running in the execution environment of the Web browser might require at some point in its life to load a new Java class in order to continue its normal operation. If the class is not available from the browser's execution environment, the browser automatically attempts to fetch the needed Java class from the Web server where the applet originated. The Web server, in turn, attempts to load the byte code for the class from its local disk. If this attempt fails, a new servlet attempts to retrieve the code from the distributed persistent storage mechanism, which is likely to be on a different machine than the Web server. The servlet then provides the Web server with the retrieved byte code, and the server sends the code to the browser. The browser includes an integrated class loader which then converts the byte code stream into a Java class directly usable by the applet. In this way, the applet is able to successfully load a Java class from a location that is different than the applet's originating Web server.

Thus, in one aspect, the present invention is a self-configurable distributed computer software system that includes a Web browser, a distributed persistent storage mechanism that stores byte code utilized by a plurality of applets distributed throughout the system, and a Web server connected to the Web browser and to the distributed persistent storage mechanism. An applet runs on the Web browser and requires byte code stored outside the Web browser in the persistent storage mechanism. The Web server includes a local storage disk for storing byte code, a servlet for retrieving the byte code from the persistent storage mechanism if byte code requested by the Web browser is not stored on the local storage disk, and communication means for sending the retrieved byte code to the Web browser. The code may be stored as Java classes, and the persistent storage mechanism may be a Lightweight Directory Access Protocol (LDAP) server.

In another aspect, the present invention is a method of enabling an applet running on a first machine to obtain needed software code from a second machine that is distinct from the machine hosting the applet's originating Web server. The method includes the steps of sending a request for the software code from the first machine to a server having a local storage disk, determining in the server whether the requested software code is stored on the local storage disk, and sending a request for the software code from the server to a distributed persistent storage mechanism upon determining that the requested software code is not stored on the local storage disk. This is followed by sending the requested software code from the persistent storage mechanism to the server, and sending the requested software code from the server to the first machine.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is used in the context of self-configurable distributed systems where components are implemented in Java. Some Java classes, for example, display handlers, are utilized to present information in a Web browser. The display handlers are not necessarily located in the machine where the Web browser is running. They can be remotely located on another machine or multiple machines since they are running a distributed application. Therefore, the byte code is not located on a single machine.

Figure 1:
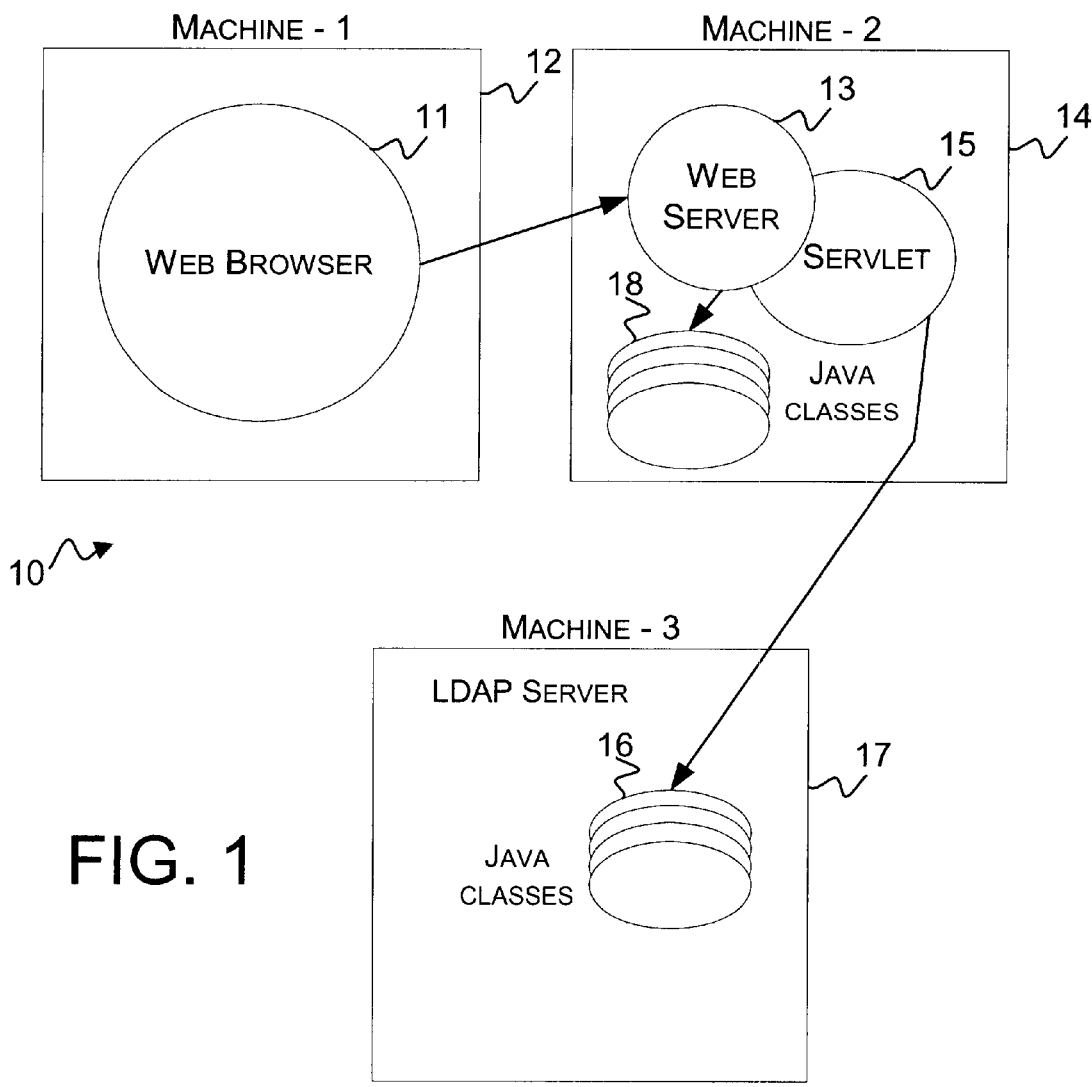
FIG. 1 is a simplified block diagram of a network architecture configured in accordance with the teachings of the present invention.

FIG. 1 is a simplified block diagram of a network architecture 10 configured in accordance with the teachings of the present invention. In FIG. 1, a Web browser 11 is running on Machine-1 (12) while a Web server 13 is running on Machine-2 (14). The present invention modifies the way the Web server works using a special Java servlet 15 enabling Java class byte code 16 to be downloaded from an alternate host such as Machine-3 which may be, for example, a Lightweight Directory Access Protocol (LDAP) server 17. The servlet is installed inside the Web server.

Whenever an applet in the Web browser 11 attempts to load code from the Web server 13, the Web server determines whether the code is located on its local disk. The Web server can retrieve the code from Java classes 18 located on the same machine (Machine-2) 14. If the requested code is not located on the Web server's local disk, the Web server requests the servlet 15 to get the code. The servlet has the intelligence to get the code from another machine or wherever it is available. The servlet gives the retrieved code to the Web server, which transfer it to the Web browser. The browser then converts the code into Java classes for usage by the applet. The servlet may obtain the byte code by several methods including, but not limited to, obtaining the code from an LDAP server, from another CORBA object, from a Sybase database, or from another Java object through Remote Method Invocation (RMI). The use of an LDAP server is preferred, but any other persistent storage mechanism can also be utilized such as a relational database or an object oriented database. For the Web server, a Java Web server such as the Java Web Server 1.1 from Sun Microsystems is perferred. However, an Apache server (a freely distributable HTTP server for Unix systems) may be utilized instead of a Java Web server with minor configuration changes.

In the preferred embodiment, the byte code that is requested by the applet in the Web browser 11 is retrieved by the Java servlet 15 from the LDAP server 17. The servlet is written in Java and is made LDAP aware through the use of an LDAP Software Development Kit (SDK). LDAP is a simplification of the OSI X.500 protocol which enables applications to load generic data from a directory server. LDAP is a database that is logically centralized but physically distributed. The code can be distributed, and the servlet only needs to know one unique logical address to access the LDAP server and download the code. Retrieving Java classes in this manner is completely seamless for applets and the Web browser since the classes are indistinguishable from normal classes stored on the file system of the Web server.

DETAILED EXAMPLE

Figure 2:
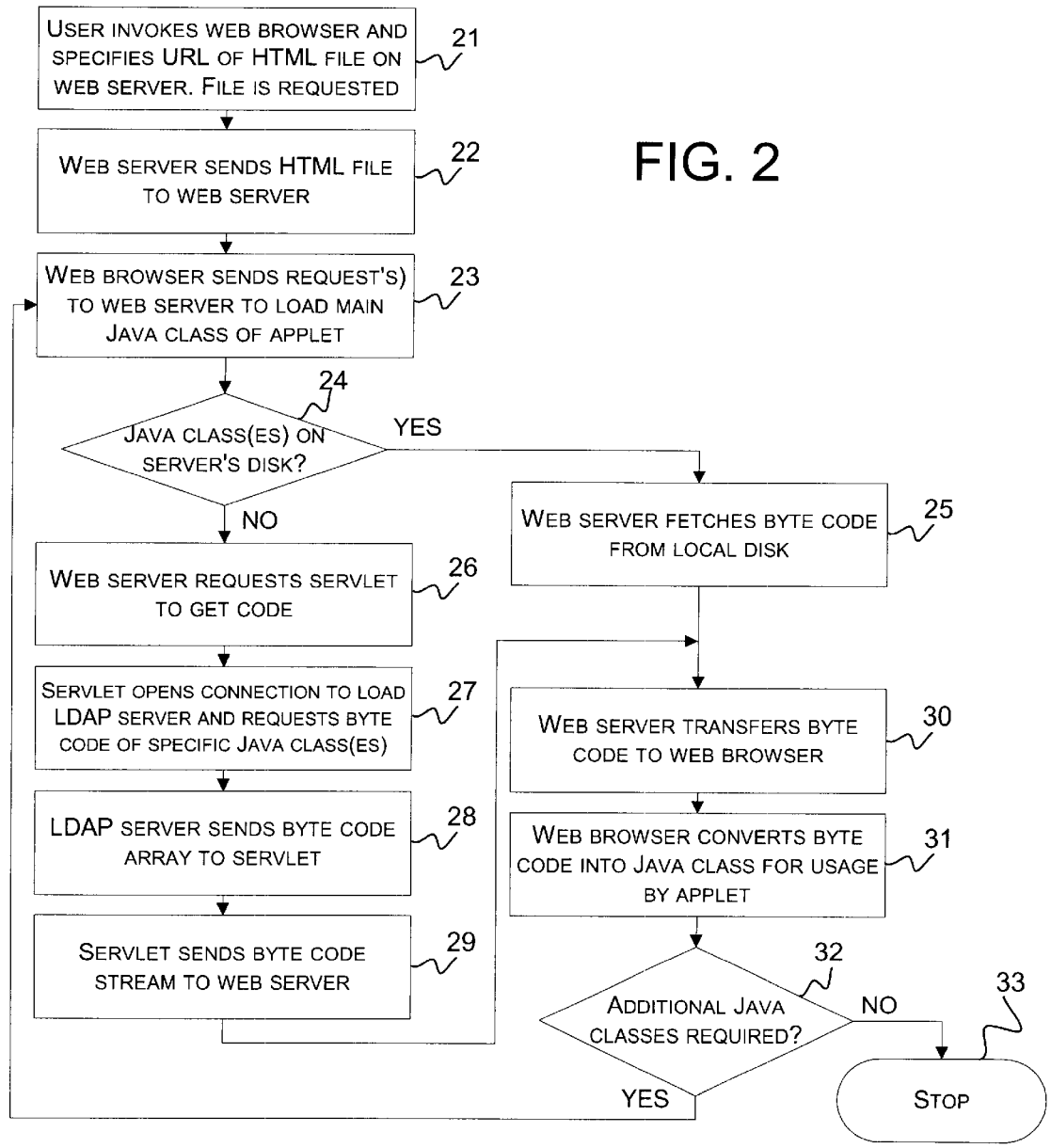
FIG. 2 is a flow chart illustrating the steps of the method of the present invention.

FIG. 2 is a flow chart illustrating the steps of the method of the present invention. At step 21, a user invokes a commercial Web browser 11 such as the well known Netscape or Microsoft Explorer browsers, and specifies the URL of an HTML file that is stored on the machine 14 where the Web server 13 is running. The browser requests the file, and at step 22, the Web server honors the request by sending the HTML file, which is then loaded in the Web browser. The HTML file contains a reference to an applet, therefore the Web browser sends a request to the Web server at step 23 to load the main Java class of the applet. The main Java class also holds references to other classes, so there may actually be a series of requests that are sent to load the full applet implementation. Normally, when a Web server receives such requests, it simply attempts to load the corresponding Java classes from its local disk. However, the requested classes may not be on the Web server's local disk.

Therefore, at step 24, the Web server 13 determines whether or not the requested Java classes are on its local disk. In the present invention, the Web server uses the first few components of the package name to determine whether the requested code is on its local disk or on the LDAP server 17. For example, a package named se.ericsson.xxx, may be on the Web server, while a package named se.ericsson.ldap may be on the LDAP server. If the package name indicates that the Java classes are on the Web server's local disk, the process moves to step 25 where the Web server fetches the byte code for the requested Java classes 18. The process then moves to step 30 where the Web server transfers the byte code to the Web browser.

If, however, the package name indicates that the Java classes are not on the Web server's local disk (i.e., the classes are on the LDAP server), the process moves to step 26 where the Web server 13 requests the servlet 15 to get the code. The Web server provides the servlet with a filly qualified Java class name for the requested code.

Upon receiving a request from the Web server, the servlet opens a connection at step 27 to the LDAP server 17, and using the class name, the servlet constructs a request to the LDAP server to load the byte code corresponding to the specific Java classes 16. At step 28, the Java classes are sent from the LDAP server to the servlet 15 in the form of a byte code array. At step 29, the servlet provides the byte code as a stream to the Web server 13, and the Web server transfers the byte code to the Web browser at step 30. At step 31, the Web browser converts the byte code into the requested Java classes usable by the applet.

At step 32 it is determined whether the applet requires additional Java classes. Additional classes may be required by the applet at that time or on a per-demand basis during the full life of the applet. If not, the process stops at 33. If an additional class is required, the process returns to step 23 where the Web browser sends a request to the Web server to load the required Java class.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A self-configurable distributed computer software system comprising:
   a Web browser including:
      an applet running on the Web browser, said applet requiring byte code stored outside the Web browser; and
      means for requesting the required byte code from a Web server;
   a distributed persistent storage mechanism for storing byte code utilized by a plurality of applets distributed throughout the system; and
   a Web server having a connection to the Web browser and a connection to the persistent storage mechanism, said Web server including:
      a local storage disk for storing byte code;
      a servlet for retrieving the byte code from the distributed persistent storage mechanism in response to a request from the Web browser, if the requested byte code is not stored on the local storage disk; and
      communication means for sending the retrieved byte code to the Web browser.

2. The self-configurable distributed computer software system of claim 1 wherein the Web server also includes:
   means for determining whether the byte code requested by the Web browser is stored on the local storage disk or in the distributed persistent storage mechanism; and
   means for retrieving the byte code from the local storage disk upon determining that the byte code requested by the Web browser is stored on the local storage disk.

3. The self-configurable distributed computer software system of claim 2 wherein the means within the Web browser for requesting the required byte code includes means for requesting one or more Java classes.

4. The self-configurable distributed computer software system of claim 3 wherein the distributed persistent storage mechanism is a Lightweight Directory Access Protocol (LDAP) server.

5. The self-configurable distributed computer software system of claim 4 wherein the Web server transfers the byte code retrieved by the servlet to the Web browser, and the Web browser includes means for converting the byte code into Java classes.

6. A self-configurable distributed computer software system having a Web server with a local storage disk for storing byte code, and a Web browser connected to the Web server, said Web browser having an applet and means for requesting and receiving byte code from the Web server for use by the applet, said system comprising:
   a distributed persistent storage mechanism for storing byte code utilized by a plurality of applets distributed throughout the system;
   means within the Web server for determining whether the byte code requested by the Web browser is stored on the local storage disk; and
   a servlet within the Web server for retrieving the byte code from the distributed persistent storage mechanism if the byte code requested by the Web browser is not stored on the local storage disk.

7. The self-configurable distributed computer software system of claim 6 wherein the byte code is stored as Java classes.

8. The self-configurable distributed computer software system of claim 7 wherein the distributed persistent storage mechanism is a Lightweight Directory Access Protocol (LDAP) server.

9. In a self-configurable distributed computer software system, a method of enabling an applet running on a Web browser to obtain needed software code from a distributed persistent storage mechanism outside a machine hosting the applet's originating Web server, said method comprising the steps of:
   sending a request for the software code from the Web browser to the applet's Web server, the Web server having a local storage disk;
   determining in the Web server whether the requested software code is stored on the local storage disk;
   requesting a servlet in the Web server to obtain the requested software code from the distributed persistent storage mechanism upon determining that the requested software code is not stored on the local storage disk;
   sending a request for the software code from the servlet to the distributed persistent storage mechanism;
   sending the requested software code from the distributed persistent storage mechanism to the servlet;
   providing the requested software code to the Web Server; and
   sending the requested software code from the Web server to the Web browser.

10. The method of claim 9 further comprising converting by the Web browser, the retrieved software code into a Java class usable by the applet.

11. The method of claim 10 wherein the step of sending a request for the software code from the servlet to the distributed persistent storage mechanism includes sending the request to a Lightweight Directory Access Protocol (LDAP) server.

12. The method of claim 11 wherein the step of sending the requested software code from the distributed persistent storage mechanism to the servlet includes sending a byte code array from the LDAP server to the servlet.

13. The method of claim 12 wherein the step of providing the requested software code to the Web server includes sending a byte stream from the servlet to the Web server.

14. The method of claim 10 wherein the request for the software code sent from the Web browser to the Web server includes a package name for a Java class, and the step of determining in the Web server whether the requested software code is stored on the local storage disk includes determining whether the requested software code is stored on the local storage disk from the components of the package name.

15. A Web server for providing requested software code to an applet in a Web browser, the Web server comprising:
- a connection to the Web browser and a connection to a distributed persistent storage mechanism outside the Web server;
- a local storage disk within the Web server for storing software code;
- a mechanism within the Web server for determining whether software code requested by the Web browser is stored on the local storage disk; and
- a servlet within the Web server that retrieves the requested software code from the distributed persistent storage mechanism and provides the code to the Web server if the software code requested by the applet is not stored on the local storage disk.

* * * * *